United States Patent [19]

Bar-on et al.

[11] 4,389,654

[45] Jun. 21, 1983

[54] INK JET DROPLET GENERATOR FABRICATION METHOD

[75] Inventors: Ari Bar-on, Rochester; John R. Debesis, Penfield, both of N.Y.

[73] Assignee: Xerox Corporation, Stamford, Conn.

[21] Appl. No.: 307,393

[22] Filed: Oct. 1, 1981

[51] Int. Cl.³ .......... G01D 15/18
[52] U.S. Cl. .......... 346/75
[58] Field of Search .......... 239/601; 222/566; 29/157 C; 346/75, 140

[56] References Cited

U.S. PATENT DOCUMENTS

| | | | |
|---|---|---|---|
| 3,359,192 | 12/1967 | Heinrich et al. | 204/143 |
| 3,655,530 | 4/1972 | Taylor | 204/229 |
| 3,701,998 | 10/1972 | Mathis | 317/3 |
| 3,726,770 | 4/1973 | Futterer | 204/16 |
| 3,949,410 | 4/1976 | Bassous et al. | 317/3 |
| 4,007,464 | 2/1977 | Bassous et al. | 239/601 |
| 4,031,561 | 6/1977 | Paranjpe | 346/75 |
| 4,034,380 | 7/1977 | Isayama | 346/75 X |
| 4,047,184 | 9/1977 | Bassous et al. | 156/661 |
| 4,058,432 | 11/1977 | Schuster-Woldan et al. | 96/36 |
| 4,169,008 | 9/1979 | Kurth | 156/653 |
| 4,184,925 | 1/1980 | Kenworthy | 204/11 |
| 4,282,532 | 8/1981 | Markham | 346/75 |

OTHER PUBLICATIONS

IBM Tech. Disclosure Bulletin, vol. 19, No. 10, Mar. 1977, R. Lane; Title: "Metal Membrane Nozzle for Ink Jet Printer".

IBM Tech. Disclosure Bulletin, vol. 21, No. 11, Apr. 1979, D. W. Gould, Jr.; Title: "Pump Bellows".

IEEE Transactions on Electron Devices, vol. ED-25, No. 10, Oct. 1978, entitled: "Silicon Charge Electrode Array for Ink Jet Printing", by Lawrence Kuhn, Ernest Bassous and Ramon Lane.

(Magazine unknown) on "Ink Jet Printing Nozzle Arrays Etched in Silicon"; Author(s) E. Bassous, H. H. Taub and L. Kuhn.

*Primary Examiner*—Donald A. Griffin
*Attorney, Agent, or Firm*—John E. Beck; Stephen J. Schultz

[57] ABSTRACT

A method for fabricating an ink jet droplet generator. According to the disclosed technique, a metallic body is first machined to define one or more ink receiving cavities and to further define an intended nozzle surface. Resist material is applied to the nozzle surface at the intended ink nozzle positions and a thin metallic plating formed on the surface. The resist and body are then etched to form one or more passageways from the ink cavities past the regions formerly occupied by the resist. These passageways form the generator nozzles.

8 Claims, 6 Drawing Figures

INK JET DROPLET GENERATOR FABRICATION METHOD

BACKGROUND OF THE INVENTION

1. Field of the Invention

The present invention relates to ink jet recording and more particularly, to improved methods for fabricating an ink jet droplet generator.

2. Prior Art

Ink jet recording is a rather sophisticated technique for recording information on a recording medium such as paper or the like. In a conventional impact printer, a well-defined or shaped stylus or type element impacts the record medium to leave an ink impression of the type element. In ink jet printing, however, a sequence of individual ink droplets strike the record member in a controlled pattern to duplicate impressions previously formed by the conventional impact technique.

A variety of ink jet printing architectures have evolved. A common element to these architectures is a mechanism for directing ink droplets toward the record medium. Architectures, for example, have been proposed which utilize single ink nozzles which pass the record medium at high speed while continually emitting a stream of ink which breaks up into ink droplets. Single nozzle arrangements have been contemplated for so-called "drop-on-demand" systems wherein ink droplets are only generated when the nozzle approaches a specific portion of the recording member and so-called continuous systems wherein the single nozzle continuously generates ink droplets which are either directed to a specific recording medium pixel or guttered to a recirculating system for reuse.

Rather than using a single ink droplet nozzle to rapidly traverse across a record medium, proposals have been made for developing an array or plurality of ink droplet nozzles spaced across a record medium for generating a number of streams of ink recording droplets. In particular, one architecture envisions stationary nozzles each of which directs a droplet stream toward the record medium along an initial path parallel to the plurality of other ink jet trajectories. Subsequent to droplet production, these proposals include droplet charging and deflecting mechanisms downstream from the droplet generator for interacting with the droplets, changing their trajectory and thereby directing the droplets to desired positions on the recording member. As seen in the literature, it is very important that the ink droplets which are provided by the ink jet recording system are properly charged as they travel toward the record medium so that they can be properly deflected. To facilitate droplet charging it is important that droplet production occur at well-defined locations with respect to the drop generator. A typical ink jet system includes a mechanism for exciting or perturbing the ink as it is squirted from the nozzle, thereby inducing droplet production in appropriate relation to a charging electrode.

In multi-jet ink jet systems, alignment of multiple ink nozzles has presented problems in array fabrication. Small variations in nozzle dimensions and alignment can be tolerated but these tolerances are quite small. One multi-nozzle array envisions the multiple nozzles having a diameter of 0.001 in. and an alignment accuracy of 2 mrad. The achievement of these rather stringent tolerances in ink jet drop generator fabrication has been a non-trival task.

One suggested fabrication method involves selective etching of nozzle openings through a thin nozzle plate which is then mounted to an ink jet generator. Co-pending U.S. application Ser. No. 245,422 filed Mar. 19, 1981 to Pollack, for example, discloses a procedure for fabricating a nozzle plate from nickel and copper using a photoresist to define nozzle openings in the nickel as the nickel is plated onto the copper.

The Pollack and other similar plate fabrication methods suffer a common deficiency. Once the nozzle plate has been fabricated the plate must be mounted to an ink cavity into which ink under pressure is forced so that the nozzles in the multi-nozzle array squirt ink droplets toward the record member. In affixing the nozzle plate to the cavity, nozzles can be misaligned due to bending of the nozzle plate and/or due to irregularities in the surface to which the plate is affixed. Thus, although the etching technique for developing the nozzles may produce nozzle structures well within the desired tolerances, the step of physically attaching this nozzle plate to the remaining portions of the ink jet droplet generator can introduce ink stream inaccuracies beyond the tolerable limits suggested above.

SUMMARY OF THE INVENTION

The present invention provides a new and improved ink jet drop generator fabrication technique which incorporates a selective etching process for forming a nozzle array without the necessity for then attaching this nozzle array to the droplet generator.

According to the preferred fabrication technique, the nozzle array for directing a series of parallel ink jet streams is fabricated as an integral part of the pressurized ink cavity so that no misalignment during an array mounting process takes place. As a first step in the fabrication technique, a metallic body is machined to define one or more ink cavities which will be filled with ink. This metallic body is also shaped to define a substantially planar nozzle surface along which the nozzles are to be positioned. Holes are drilled or extended from the surface defining the one or more ink jet cavities toward the planar nozzle surface until those holes extend within a specified distance of the surface. The number of such holes corresponds to a desired number of nozzles in the drop generator.

Once these initial steps are accomplished, an aperture plate electroforming process is initiated. The metallic body's planar surface is first treated in preparation for metallic plating. Typically, this treatment would involve the cleaning and smoothing of the planar surface. Once this has been achieved, discrete portions of a dielectric material are applied to regions of the planar surface in alignment with the cylindrical holes drilled in the metallic body. The diameter of each dielectric site is substantially the same as the diameter of the nozzle and in the preferred embodiment is about 1 mil. The next step in the process is the plating of a metallic layer onto the planar surface to form an aperture plate. The metallic layer abuts the dielectric material to form nozzle openings having the same diameter as the dielectric material. The dielectric material sites are then removed and through passages between the cavity and the nozzle plate are opened by selective etching of the metallic body. In most prior art systems, some mechanism for perturbing the ink inside the cavity is required. Accordingly, a perturbation device such as a piezoelectric crystal is attached to the completed nozzle array to control droplet formation.

A preferred material for forming the metallic body which defines the ink jet cavities is brass. This material can be easily machined into an appropriate form and also provides a surface for the plating of a nozzle aperture plate. In the preferred embodiment, nickel plating is applied to the planar nozzle surface after the brass surface has been appropriately treated to insure a strong bond between metals. The fabrication technique takes advantage of the rigidity of brass and the resistance of nickel to etching by the bath used to open through passage between the body cavity and the nozzle aperture plate. The nickel and brass are typically not resistant to the ink used for ink jet printing. In most ink jet applications, therefore, it is necessary to plate the completed brass and nickel structure with a thin plating to passivate the generator from attack by the ink prior to attachment of the excitation mechanism. In the preferred embodiment this plating comprises a gold plating.

Practice of the invention enables the fabrication of single or multiple precisely aligned uniform cross-section nozzles with no need to separately attach a nozzle plate. From the above, it should be appreciated that one object of the present invention is a fabrication method for providing uniform, properly aligned and properly dimensioned ink jet nozzle arrays for use in an ink jet droplet generator. Other objects, advantages and features of the present invention will become better understood when a preferred embodiment of the invention is described in conjunction with the accompanying drawings.

DETAILED DESCRIPTION

Figure 1:
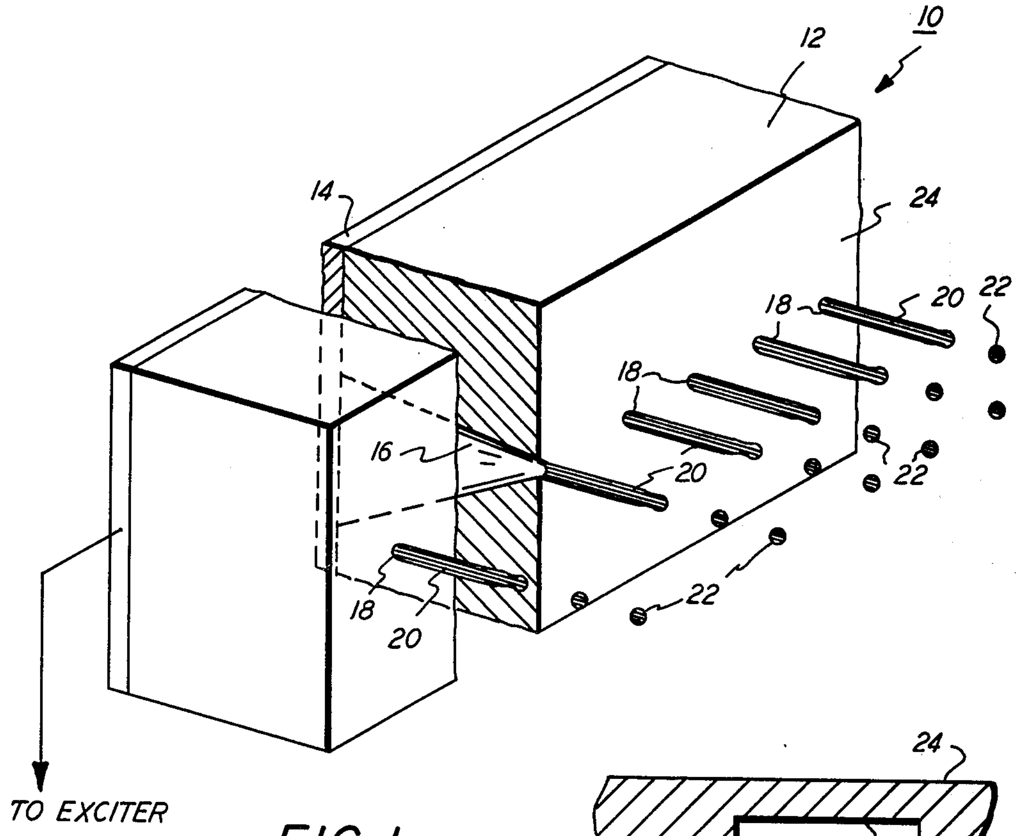
FIG. 1 is a perspective view, partially in section, schematically illustrating a multi-nozzle ink droplet generator having an ink excitation surface for controlling droplet breakoff.

Turning now to the drawings, a preferred ink jet drop generator fabrication process will be described with particularity. FIG. 1 shows a schematic representation of a two piece drop generator, indicated generally by the reference numeral 10, constructed in accordance with the present invention. The generator 10 comprises a main body 12, and excitation surface or plate 14 which includes a piezoelectric excitation material coupled to an external source of energy.

As illustrated in FIG. 1, the body 12 defines a cavity 16 for receiving ink under pressure from an external ink supply. The function of the drop generator 10 is to direct ink from the cavity 16 through a plurality of nozzles 18 along controlled paths to impinge upon a recording medium such as paper or the like. The excitation surface 14 supplies pressure waves to perturb the ink inside the cavity 16 that cause each ink column 20 exiting its associated nozzle 18 breaks up into individual droplets 22 at a preselected distance from a nozzle plane 24 defined by the body 12. A typical ink jet system further includes droplet charging and droplet deflection apparatus downstream from the nozzles 18 which influence the trajectory of the ink droplets in their path to the recording medium. Since the present invention relates to a nozzle fabrication method, illustration and discussion of this further apparatus is omitted from the present invention. U.S. Pat. No. 4,238,804 to Warren entitled "Stitching Method and Apparatus for Multiple Nozzle Ink Jet Printers" discloses one ink jet system which might utilize the present nozzle fabrication method. That patent is incorporated herein by reference.

The ink generator fabrication technique embodying the present invention begins with the fabrication of the body 12, preferably from brass. Machining techniques known in the art are used to create a cavity 16 and a planar nozzle surface 24 extending along the width of the body 12. The cavity 16 might comprise a single region extending along a width of the body 12 or alternatively, might comprise a series of equally spaced yet connecting cavities having a specified volume and shape. The performance of the ink jet system depends upon the shape of the ink supporting cavity 16. Copending U.S. patent application Ser. No. 045,044 entitled "Ink Jet Method and Apparatus Using a Thin Film Piezoelectric Exciter" to Markham discusses the importance of the shape of the confining cavity within the droplet generator. Once a specific design is chosen, the body 12 is constructed in conformity with this choice to insure proper ink jet system droplet generation.

Figure 2:
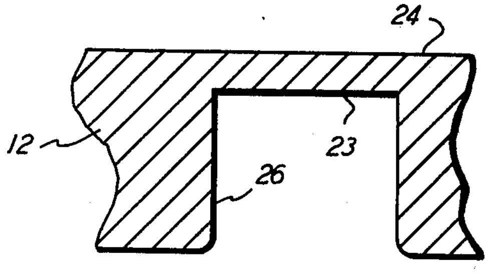
FIG. 2 is a fragmentary, sectional elevational view showing a portion of a FIG. 1 generator body as it appears prior to nozzle fabrication.

After a body configuration has been chosen and the initial fabrication procedure completed, a series of equally spaced nozzles 18 must next be formed along the nozzle plane 24. These nozzles direct ink under pressure from the cavity 16 to the recording surface. As a first step in the nozzle fabrication, a series of approximately 20 mil (500 microns) diameter flat bottom blind holes are drilled into the body 12 to extend the cavity 16 to within a specified distance of the planar nozzle surface 24. The number of these holes correspond to the number of actual nozzles desired in the drop generator 10. A cross section of a portion of the body 12 with a blind hole 26 machined into the body has been shown in FIG. 2. Once a series of blind holes have been formed in the body 12, the planar surface 24 is machined for flatness so that the dimension between the surface 24 and the bottom 23 of blind hole 26 is preferably about 0.005 inches (127 microns). The physical integrity of the blind holes 26 are maintained during the ensuing fabrication process steps by plugging the blind holes with a material 27 which is not attacked or affected by the plating baths to be used in subsequent steps. One such material comprises styrene methyl methacralate copolymer.

The brass body 12 is next cleaned to insure adherence of nickel plating to the brass surfaces. The planar surface 24 is then masked with a material resistant to nickel plating and the body 12 is placed in a nickel plating bath so that a protecting layer 25 of nickel is plated over the exposed brass surface of the cavity 16. The mask material is removed and the body 12 is ready for electroforming of the nozzles 18.

Figure 3:
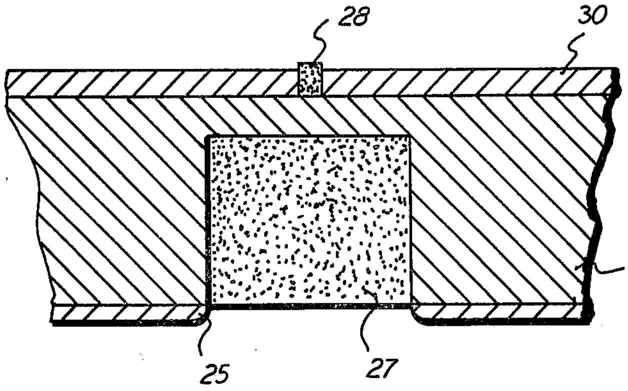

The preferred nozzle fabrication begins with the placement of a dielectric material 28 in registration with the blind holes drilled into the body. The preferred dielectric material comprises a photoresist material marketed under the trade name RISTON (registered trademark) by Dupont. The Riston regions 28 are applied by conventional photoresist application methods wherein the Riston is rolled onto the surface 24 to a thickness of about 1.5 mils (38.1 microns), then exposed and developed to leave cylindrical posts having a diameter of about 1 mil (25.4 microns). Next, the surface 24 is nickel plated to a thickness of about 1 mil (25.4 microns) to form a nozzle plate 30 having apertures in the regions occupied by the Riston posts 28. A cross section of the body 12 and nozzle plate 30 in the region of one of the Riston posts is shown in FIG. 3. The two nickel layers 25,30 could be plated simultaneously if the same thickness layers are desired for both nozzle plate and protective layer.

Figure 4:
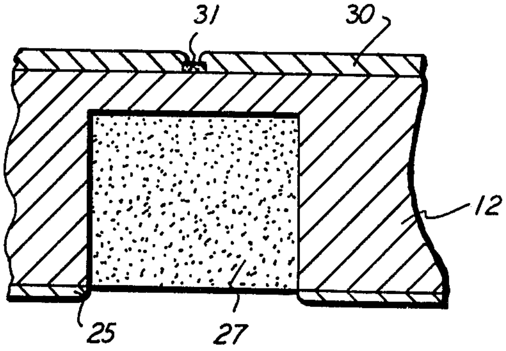
FIGS. 3 and 4 are fragmentary, sectional elevational views depicting the generator after a photoresist has been applied and a metallic layer plated onto the FIG. 2 representation to form an aperture plate.

An alternate nozzle plate fabrication method involves the application and selective development of a much thinner dielectric layer (FIG. 4) to the planar surface 24 opposite the blind holes 26. According to this alternate method a one micron thick layer of photoresist is applied to the surface 24 and then selectively developed to leave thin cylinders 31 of Riston having a diameter greater (typically three times greater) than the desired nozzle diameter. When the nickel aperture plate 30 is plated to the exposed brass surface it extends over the periphery of the material such that the exposed portion of Riston has about a 1 mil (25.4 microns) diameter.

Figure 5:
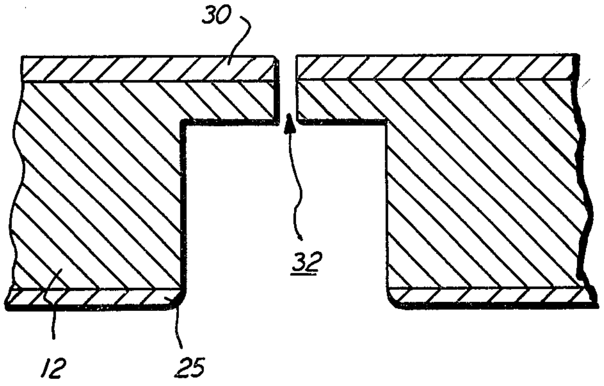
FIGS. 5 and 6 are fragmentary, sectional elevational views showing the ink jet nozzle after fabrication has been completed.
Figure 6:
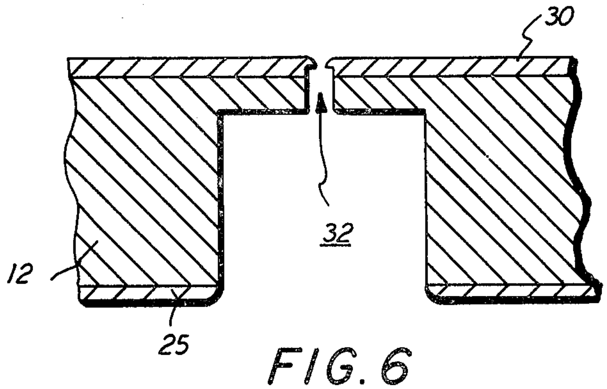

Once the nickel aperture plate 30 is plated to a proper thickness (about 1 mil), the material 27 used to plug the blind holds can be dissolved in a hydrocarbon solvent, e.g. trichloroethylene, in an ultrasonic bath. As a final step in the nozzle fabrication process, the now exposed portions of the body 12 extending between the aperture plate and the blind holes are etched in a solution which does not attack the nickel plating 25,30 but etches the brass comprising the body 12. Suitable baths for this etching process comprise sodium persulfate or a commercial alkalai etchant marketed by Shipley Company, Inc., 2300 Washington St., Newton, Mass. 02162 or McDermid Inc., Waterbury, Conn. This etching process also removes the photoresist material adhering to the brass body at the intended nozzle sites. FIGS. 5 and 6 illustrate the cross-sections of a completed nozzle after the brass and dielectric material have been etched away from the FIGS. 3 and 4 structure, respectively, forming an extension or passageway 32 from the cavity 16 past the nozzle plate 30.

Before the excitation plate 14 is attached to the body 12 to complete the drop generator 10, the body may need to be plated with a thin gold plating to passivate it against corrosive attack by ink inside the cavity 16. The excitation plate 14 is attached to the now completed body 12 through techniques known in the art. One such technique comprises the machining of mounting holes into the body 12 and attachment of the back plate 14 with suitable fasteners. The typical back plate 14 will include a sealing gasket or the like to prevent ink leakage during operation.

Although the preferred embodiment has been described with a degree of particularity, it should be appreciated by those skilled in the art that certain modifications might be made to this preferred embodiment. In particular, materials other than brass and nickel might be chosen as suitable fabrication materials. It is also conceivable that the body 12 could be constructed in such a way that no further machining or drilling of extensions of the cavity 16 be required prior to the plating and etching. It is the intent, therefore, that all such modifications or changes falling within the spirit or scope of the appended claims be covered by this invention.

We claim:

1. A method for fabricating an ink jet drop generator comprising the steps of:
- forming a metallic body having an ink cavity therein and a substantially planar nozzle surface;
- extending the cavity into said body to within a specified distance of planar nozzle surface at at least one location;
- applying a dielectric material to the region of the planar nozzle surface in alignment with the location at the cavity extension;
- electroforming a nozzle plate by adherently plating a metallic layer to other regions of said planar surface not covered by dielectric material; and
- etching said metallic body in the region between the cavity extension and the planar surface to create passage-way between the cavity and the planar surface.

2. The method of claim 1 wherein said metallic body is a brass member and said plating step affixes a nickel layer to said brass body.

3. The method of claim 1 or 2 which further comprises the step of attaching means for generating pressure waves in ink in said cavity to initiate droplet break-off at a desired distance from said nozzle surface.

4. A method of fabricating an ink jet drop generator comprising the steps of:
- machining a metallic body to define one or more ink cavities within said body and to further define a substantially planar nozzle surface;
- extending one or more blind holes into said body to extend said one or more ink cavities to within a specified distance of said planar nozzle surface, the number of said holes corresponding to a desired number of nozzles in said drop generator;
- plugging said blind holes with a passivating material to protect a bottom surface of said holes;
- treating said planar surface to prepare said surface for metallic plating;
- applying discrete portions of a dielectric material to regions of said planar surface aligned with said cylindrical segments;
- electroforming a nozzle plate by adherently plating a metallic layer to said planar surface;
- removing said passivating material from said blind holes;
- etching said metallic body in the region between said blind holes and said planar surface to create one or more passageways from said one or more cavities past said planar surface to the regions formerly occupied by dielectric material; and
- attaching means for perturbing ink in said one or more cavities to said body, said means for perturbing operative to cause ink forced through said passageways to break up into discrete droplets at a desired distance from said nozzle plane.

5. The method of claim 1 or 4 which further comprises the step of gold plating said body and metallic layer prior to attaching said means for perturbing.

6. The method of claim 5 wherein in addition to the electroforming of a metallic layer to said planar surface a metallic layer is plated onto interior portions of said one or more ink cavities which resists etching of said interior when the passageways are etched.

7. A method of fabricating an ink jet drop generator comprising the steps of:

machining a brass body to define an ink cavity within said body and to further define a substantially planar nozzle surface;

extending one or more blind holes into said brass body to extend said ink cavity to within a specified distance of said planar nozzle surface, the number of said holes corresponding to a desired number of nozzles in said drop generator;

treating said planar surface to prepare said surface for metallic plating;

applying discrete portions of a dielectric material to regions of said planar surface aligned with said blind holes, said dielectric portions having cross sections on the order of the cross sections of said blind holes;

plating said planar surface with a nickel layer having a thickness slightly greater than the thickness of said dielectric to cause said plating layer to extend across an outer periphery of said dielectric material;

etching said metallic body in the region between said blind holes and said planar surface to create one or more passageways from said one or more cavities past said planar surface to the regions formerly occupied by said dielectric material; and attaching to said body means for generating pressure waves in the perturbing ink in said one or more cavities, said means for generating operative to cause ink forced through said passageways to break up into discrete droplets at a desired distance from said nozzle plane.

8. The method of claim 7 which further comprises the step of gold plating outer surfaces of said brass body and nickel layer prior to the attaching of said means for perturbing.

* * * * *